United States Patent
Kallianpur et al.

(12) 
(10) Patent No.: US 12,299,084 B2
(45) Date of Patent: May 13, 2025

(54) ARTIFICIAL INTELLIGENCE OPTIMIZATION PLATFORM

(71) Applicant: HEWLETT PACKARD ENTERPRISE DEVELOPMENT LP, Houston, TX (US)

(72) Inventors: Chaitra Kallianpur, Westborough, MA (US); Kalapriya Kannan, Bangalore (IN); Suparna Bhattacharya, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 1044 days.

(21) Appl. No.: 17/153,852

(22) Filed: Jan. 20, 2021

(65) Prior Publication Data

US 2022/0230024 A1    Jul. 21, 2022

(51) Int. Cl.
*G06N 20/00*    (2019.01)
*G06F 18/20*    (2023.01)
*G06F 18/214*   (2023.01)
*G06F 18/22*    (2023.01)

(52) U.S. Cl.
CPC .......... *G06F 18/285* (2023.01); *G06F 18/214* (2023.01); *G06F 18/22* (2023.01); *G06N 20/00* (2019.01)

(58) Field of Classification Search
CPC ...... G06F 18/285; G06F 18/22; G06F 18/214; G06N 20/00
See application file for complete search history.

(56) References Cited

U.S. PATENT DOCUMENTS

| | | | | |
|---|---|---|---|---|
| 12,052,260 | B2 * | 7/2024 | Kozhaya | G06T 9/002 |
| 2020/0364551 | A1 * | 11/2020 | Dwivedi | G06N 3/08 |
| 2021/0110310 | A1 * | 4/2021 | Guim Bernat | G06F 16/27 |

OTHER PUBLICATIONS

Anderson, Robert, et al. "Recurring concept meta-learning for evolving data streams." Expert Systems with Applications 138 (2019): 112832. (Year: 2019).*
Zhou, Ling, Tsuyoshi Tanaka, and Daisuke Tashiro. "Data Similarity Estimation for AI Model Reuse." (2020) (Year: 2020).*
Guo, Peizhen, et al. "Foggycache: Cross-device approximate computation reuse." Proceedings of the 24th annual international conference on mobile computing and networking. 2018. (Year: 2018).*

(Continued)

*Primary Examiner* — Michael W Ayers
*Assistant Examiner* — Nicholas S Wu
(74) *Attorney, Agent, or Firm* — Sheppard Mullin Richter & Hampton LLP

(57) ABSTRACT

Systems and methods are provided for reusing machine learning models. For example, the applicability of prior models may be compared using one or more assessment values, including a similarity threshold and/or an accuracy threshold. The similarity threshold may identify a similarity of data between a first data set used to generate a first model and a new data set that is received by the system. When the similarity between these two data sets is exceeded, the system may reuse a model with the highest similarity value. When an accuracy value of the data set does not exceed an accuracy threshold, the system may initiate a retraining process to generate a second ML model associated with the second data.

20 Claims, 8 Drawing Sheets

(56) References Cited

OTHER PUBLICATIONS

Mastorakis, Spyridon, et al. "Icedge: When edge computing meets information-centric networking." IEEE Internet of Things Journal 7.5 (2020): 4203-4217. (Year: 2020).*
Samarah, Samer, et al. "Transferring activity recognition models in FOG computing architecture." Journal of Parallel and Distributed Computing 122 (2018): 122-130. (Year: 2018).*
Bharde et al., "Store-Edge RippleStream: Versatile Infrastructure for IoT Data Transfer", HotEdge, 2018, 6 pages.
Brownlee, Jason, "How to Check-Point Deep Learning Models in Keras", Machine Learning Mastery Pty. Ltd., available online at <https://machinelearningmastery.com/check-point-deep-learning-models-keras/>, 2020, 44 pages.
Chen et al., "Deep Learning Training Times Get Significant Reduction", IBM, available online at <ibm.com/blogs/research/2018/02/deep-learning-training/>, Feb. 5, 2018, 7 pages.
Das et al., "Multi-criteria online frame subset selection for autonomous vehicle videos", Pattern Recognition Letters, vol. 133, 2020, pp. 349-355.
Data Science Stack Exchange, "Should a model be re-trained if new observations are available?", available online at <https://datascience.stackexchange.com/questions/12761/should-a-model-be-re-trained-if-new-observations-are-available>, 2021, 6 pages.
DataRobot, Inc., "DataRobot", available online at <datarobot.com>, 2021, 8 pages.
Eck et al., "Scalable Deployment of AI Time-series Models for IoT", 2020, 7 pages.
Garc'ia et al., "Early Drift Detection Method", 2005, 10 pages.
Guo et al., "FoggyCache: Cross-Device Approximate Computation Reuse", ACM, 2018, 16 pages.
Guo et al., "Potluck: Cross-Application Approximate Deduplication for Computation-Intensive Mobile Applications", Association for Computing Machinery, 2018, 14 pages.
H2O AI, "H2O AI Hybrid Cloud", available online at <https://www.h2o.ai/>, 2021, 8 pages.
Huang et al., "Scalable AutoML for Time Series Forecasting using Ray", Intel, Jul. 9, 2020, 24 pages.
Johnson et al., "Billionscale similarity search with GPUs", CoRR, 2017, 11 pages.
Kannan et al., "SEeSAW—Similarity Exploiting Storage for Accelerating Analytics Workflows", HotStorage'16, 2016, 5 pages.
Luigi, "The Ultimate Guide to Model Retraining", Deployment TagsMonitoring, Retraining, available online at <https://mlinproduction.com/model-retraining/>, Jun. 10, 2019, 9 pages.
Makkinejad et al., "Reduction in training time of a deep learning model in detection of lesions in CT", SPIE Medical Imaging, 2018, 13 pages.
Miranda et al., "Reducing the Training Time of Neural Networks by Partitioning", ICLR, 2016, 10 pages.
ScienceDaily, "New technique cuts AI training time by more than 60 percent", available online at <https://www.sciencedaily.com/releases/2019/04/190408114322.htm>, Apr. 8, 2019, 4 pages.
Seif, George, "3 ways to improve your Machine Learningresults without more data", Towards Data Science, available online at <https://towardsdatascience.com/3-ways-to-improve-your-machine-learning-results-without-more-data-f2f0fe78976e>, Dec. 28, 2018, 4 pages.
Wong et al., "Transfer Learning with Neural AutoML", Jan. 28, 2019, 17 pages.

* cited by examiner

| Instance number | Model Catalog | Similarity Score | MSE for reused model | MSE for Original vs reused model | MSE for original model |
|---|---|---|---|---|---|
| 1 | M1 | 0 | 0 | 0 | 0 |
| 2 | | | | | |
| 3 | M2 | 1 | 4.3332e-05 | 1.5670e-07 | 4.5984e-05 |
| 4 | M3 | 0.428571 | 0.00141769 | 0 | 0.00141769 |
| 5 | M4 | 0.333333 | 0.00659534 | 0 | 0.00659534 |
| 6 | M2 | 1 | 4.3797e-05 | 6.0615e-05 | 6.7088e-05 |
| 7 | M2 | 0.818182 | 0.000106083 | 1.0319e-06 | 0.00010878 |
| 8 | M2 | 0.818182 | 0.000292571 | 5.1542e-05 | 0.0002369 |
| 9 | M2 | 1 | 6.7465e-06 | 5.1986e-06 | 1.3808e-06 |
| 10 | M2 | 1 | 6.4281e-06 | 3.7462e-06 | 2.8014e-06 |
| 11 | M2 | 1 | 1.6322e-05 | 4.3763e-08 | 1.6703e-05 |
| 12 | M5 | 0.666667 | 0.000150809 | 0 | 0.000150809 |

ARTIFICIAL INTELLIGENCE OPTIMIZATION PLATFORM

DESCRIPTION OF RELATED ART

Millions of machine learning models are created for predicting future behavior of edge computing devices and sensors in various contexts. However, this use of processing resources may be better-applied for other uses. Better methods and systems are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 illustrates sample metrics for determining similarity between machine learning models, in accordance with some embodiments of the application.

Figure 1:
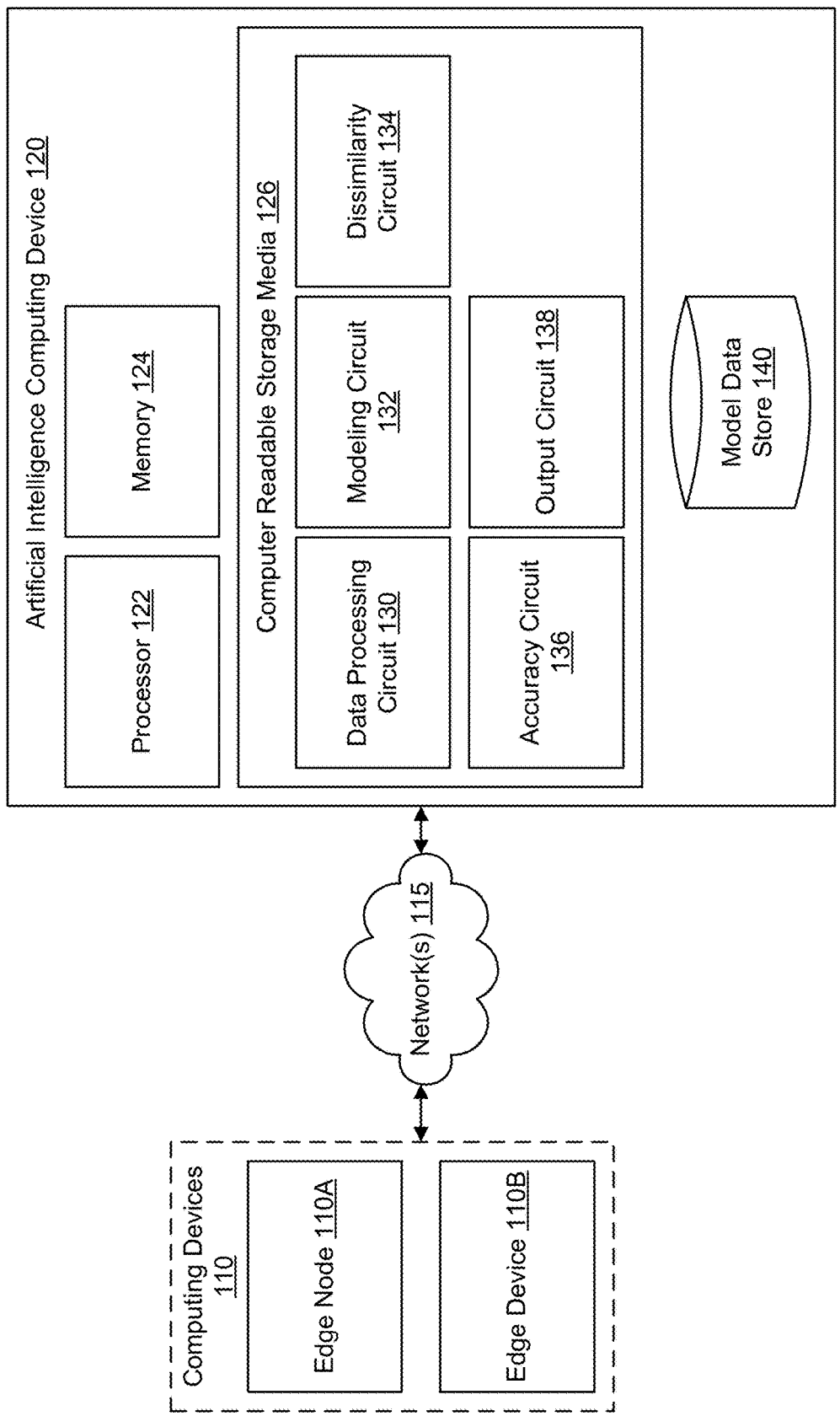
FIG. 1 illustrates an artificial intelligence computing device in communication with one or more edge devices via a network, in accordance with some embodiments of the application.

The figures are not exhaustive and do not limit the present disclosure to the precise form disclosed.

DETAILED DESCRIPTION

Artificial intelligence relies heavily on models that learn patterns from data. As such, training of these models is at the heart of artificial intelligence systems. As data is being generated continuously, models need to be refined or retrained to capture information from each incoming data set. Training and retraining are cost intensive operations that require computation, time, and storage to perform the operations. With growing data size and frequent model training to capture near real time pattern, the pressure on computation and storage becomes considerably high.

As an illustrative example, a single customer may have a single time series data metric to predict future behaviors (e.g., "k" instances are used to predict the next "h" instances, etc.). For instance, a first model (e.g., autoregressive integrated moving average (ARIMA) model) uses "k" instances to make a prediction. The first model may also use the latest "k" instances to predict the next "h" instances. A common practice may be that the first model is trained or fitted on every new "k" instances. However, rather than training the first model for every new "k" instances, an improved process of training this model may involve reusing past models. Unfortunately, when data change, the model (i.e., a past model) may no longer be able to generate an accurate prediction for the new dataset.

Additionally, the data repositories utilized in model training may receive data from wide variety of sources. For example, data can be received from different edge devices and nodes, including virtual or physical sensor data, internet of things (IoT) data, time series data, data storage monitoring devices, artificial intelligence (AI) operations data, alerts, support captures, logs, and telemetry. These data sets are received and analyzed by various devices in different analytical pipelines to produce model output. These repositories are also used for a wide variety of machine learning model development. However, some of the data used by these models are from the same sources and/or locations, making several of these models redundant, taking up value memory in these computing systems.

Data sources often include different servers running similar processing workloads or sensors from various industries collecting data. These may include a wide range of data, including wind conditions of wind mills to a counter that monitors a number of virtual machines (VM) initialized at five minute intervals. In each case, very little change is identified between these collection points. Additionally, any data patterns often repeat for similarities between the sources with batches of data (e.g., similar upward trend, downward trend, or constant change). In some examples, similarity of data may be a function of the sensitivity of the models, so that a definition of a function that captures similarity of data set with respect to its usage in artificial intelligence and model training.

Embodiments of the application may reuse trained machine learning models for predicting outcomes when the dataset used to train the first model is similar within a threshold value of a later-received dataset. Models may be reused for the same or different sources, time series data, environmental or seasonal patterns (e.g., lower data package processing around holidays, etc.), and data patterns. In this instance, a second model would not need to be generated. Rather, the system may reuse the first model to predict an outcome associated with the later-received dataset.

The applicability of prior models may be compared using one or more assessment values, including a similarity threshold, dissimilarity threshold, and/or an accuracy threshold. Various mechanisms or approaches to determining similarity/dissimilarity are contemplated throughout the disclosure. For example, a similarity threshold may be implemented to identify a similarity of data between a first data set used to generate a first model and a new data set that is received by the system. When the similarity between these two data sets is meets or exceeds the similarity threshold, the system may reuse a model with the highest similarity value. If the similarity threshold is not met/exceeded, the system may train an existing model with the new data set and compute an accuracy value. In some examples, the system may alternatively compare a dissimilarity value with a dissimilarity threshold. The system may compare data associated with the prior models to determine that the data does not exceed the dissimilarity threshold. In other examples, an accuracy value of the data set with the model may be compared with an accuracy threshold. When the value exceeds the accuracy threshold, the system may use the existing model to run forecast predictions. Otherwise, the system may generate a new model for the new data set or the similarity threshold is adjusted for the first model.

In some embodiments, the accuracy value may be compared with the accuracy threshold. If accuracy from reusing the previous model is not above desired threshold, the process may adjust the similarity threshold for that model to be more stringent. For example, when the accuracy value does not exceed the accuracy threshold, the similarity threshold is adjusted for the first model. This process may correspond with model sensitivity aware similarity detection.

In some embodiments, a model catalog is generated and maintained that would include at least the first model and parameters identifying the training data used to train the first model. The model catalog would store information associated with each model by comparing a checkpoint associated with the model with new data, or before retraining the first model in view of finding a use for other data sets. In some examples, new models may be built and trained only on dissimilar data sets and preexisting models may be reused with high confidence on similar data sets.

Some traditional systems may use data processing optimizations like sampling and queries on similar data. These methods rely on similarity metrics like cosine and Euclidean measurements. The present application uses similarity for recommending existing models stored in a data repository (e.g., when the similarity value between data sets exceeds a similarity threshold). Existing similarity measurement approaches are not used for recommending existing suitable models for data.

In another example, drift-based techniques may be implemented in traditional systems to determine when to retrain a model. The present application recommends an alternate model when drift happens. Existing works using drift do not recommend an alternate model to use when it drifts.

In another example, model reuse may be implemented in traditional systems in the context of having a model registry, which can allow the system to search for existing models and use them. These existing models may be retrained for the new data set without consideration for accuracy. The present application recommends models on conditions of similarity and accuracy where the system attempts to avoid model training, when possible.

In another example, transfer learning may be implemented in traditional systems to reduce the retraining cost. The present application can avoid transfer learning where an existing model can predict the model output or forecasting predictions. In other scenarios it can complement transfer learning techniques by recommending the closest model to transfer from.

Technical improvements are shown throughout the application. For example, by reusing machine learning models, data storage, and computation cycles traditionally used for training models is significantly reduced (e.g., up to 70% in certain cases) while maintaining accuracy. This is at least because the processing requirement for retraining the model greatly exceeds the processing requirement for comparing two data sets in the determination of the similarity value and/or the accuracy value. Further, in traditional systems, the acceptable level of accuracy is left to the applications that utilize the insights from analytics. Embodiments described herein may ensure that the acceptable accuracy level is preserved while selecting models. The model may be reused if the similarity of the incoming data is above a given threshold and the system may compute the accuracy of the prediction from the reused model. If the accuracy value is below the given threshold, then a new model is created from the incoming data and used for further prediction.

Data transmissions are also optimized. For example, data transmissions may be optimized from user devices and/or edge devices to a core computing system by providing a mechanism to filter dissimilar data based on the sensitivity of the model.

FIG. 1 illustrates an artificial intelligence computing device in communication with one or more edge devices via a network, in accordance with some embodiments of the application. As illustrated, one or more computing devices 110 (illustrated as edge node 110A, edge device 110B) may transmit data via network 115 to artificial intelligence (AI) computing device 120.

In some illustrative environments, multiple machine learning models may exist for a user associated with particular computing devices 110 for a time-series data set. Each user may identify a customized setup for their infrastructure both in terms of hardware configuration (e.g., compute, storage, networking) and software platform versions. The workload on the infrastructure may be different for each user, causing the large scale time series models being reported to be different for each user as well. Artificial intelligence computing device 120 may promote reuse of these models.

In some examples, models and training data sets may be stored with model data store 140. Reusing models may reduce overall data and create a more efficient system overall. In some production environments, data may grow periodically and cause more data processing strain and increase cost for operations. By reusing models, the strain and cost are mitigated to a reasonable extent. Further, the proliferation of too many models of non-similar datasets can serve as a criteria to train a more complex model with combined datasets, where suitable. This could result in optimizing the number of models in the model catalog where more complex models can be replaced for models training on smaller data sets having limited patterns.

Computing devices 110 (illustrated as edge node 110A, edge device 110B) may comprise edge nodes or devices that generate time series data. The data may be transmitted via network 115 to artificial intelligence computing device 120. Artificial intelligence computing device 120 can optimize AI training and retraining phases by storing models that are used on data and reusing the models on similar subsequent data set.

Artificial intelligence computing device 120 may comprise processor 122, memory 124, and computer readable storage media 126 with one or more specialized circuits for performing operations described herein. Additional information associated with processor 122, memory 124, and computer readable storage media 126 is provided with FIG. 8. The specialized circuits may comprise, for example, data processing circuit 130, modeling circuit 132, dissimilarity circuit 134, accuracy circuit 136, and output circuit 138. Artificial intelligence computing device 120 may access and update model data store 140 to maintain information corresponding to a set of machine learning models.

Data processing circuit 130 is configured to receive data from one or more computing devices 110 via one or more networks 115. For example, time series data may be received from edge node 110A and edge device 110B as a data matrix of dimension "m×n" (e.g., "m" number of rows by "n" number of columns). If rows represent time instance, columns represents a dimension/metric being ingested or vice-versa. A data set may correspond with a block of data in this matrix of size equivalent to the training set. Data may be received different times or from different sources and stored in a matrix format. In some examples, rows may indicate time instances while columns may indicate metrics (e.g., backup bytes, capacity, etc.).

Data processing circuit 130 is configured to receive a data set and compare it to existing data set information (e.g., with dissimilarity circuit 134). The similarity and sensitivity values (e.g., similarity value, accuracy value, other assessment values, etc.) between the data sets may be used to recommend a corresponding model to use with the new data. The output of the model may be used to measure the performance of model, and if the performance metrics such as accuracy and the like does not meet the requirements, the model may be dropped (e.g., stored in the system but not used with this data set, implemented with a different data set, etc.).

Modeling circuit 132 may receive, generate, and store machine learning models along with the data information in model data store 140. Model data store 140 may correspond with artificial intelligence computing device 120 or correspond with an external data repository. In some examples, a new model may be generated when the similarity value fails to exceed the similarity threshold for any existing model.

Modeling circuit 132 is configured to analyze the models to determine parameters associated with each model. The parameters for the models may be stored with model data store 140. In some examples, modeling circuit 132 builds a model data store 140 with models only on dissimilar data sets while reusing one of the suitable models from the catalog for similar data sets. Model data store 140 may be flexible in storing the model information and providing quick searches to identify the model suitable a newly received data set.

Model data store 140 may be designed to search or scale for large number of models. Modeling circuit 132 may search model data store 140 using various searching processes that can determine similarity in an input data vector. For example, the process may identify K-Nearest Neighbors in data stores closest to it or other relevant similarity processes.

Modeling circuit 132 is configured to retrain models. For example, the model may be retrained based on a predetermined time period (e.g., every 1 day, every 3 days, etc.). This may help keep the model accurate in accordance with the latest patterns in the data set, including when the data set is received on a continuous or periodic basis.

Modeling circuit 132 is configured to skip retraining the model. For example, modeling circuit 132 may compare the similarity of the incoming data with the existing data (e.g., using dissimilarity circuit 134). When the two data sets are within a similarity threshold, the retraining process may be canceled or skipped until the next predetermined time period.

Dissimilarity circuit 134 is configured to determine a similarity value between two objects (e.g., data sets, etc.) using a similarity function. The similarity value may be determined as a metric for comparing data sets, including Pearson's correlation, Spearman's correlation, Kendall's Tau, Cosine Similarity, Jaccard Similarity, Euclidean distance, Manhattan distance, and the like. One or more similarity values may be computed on raw data, rate of change, and/or transformations such as discrete wavelet transform (DWT), and the like.

Dissimilarity circuit 134 is configured to compare the similarity value with the similarity threshold. In some examples, a similarity threshold is function of the model sensitivity measured as error observed in the predictions. Computing the similarity threshold itself may use an existing process (e.g., cosine, Jaccard, Euclidean, etc.). In case of multi-dimensional data, a similarity threshold may be measured independently for each dimension and an aggregate score may be used to the compare data sets.

In some examples, the similarity threshold may be based on one or more features of the model. For example, the computation of the similarity threshold may identify features that are important to model either through supervised or unsupervised Principle Component Analysis (PCA) techniques. Similarity methods can be used on these features based on their types and computed.

Dissimilarity circuit 134 is also configured to consider an instance length for the similarity value. For example, an influencing factor for the obtained good similarity reuse is an instance length and pattern within the length used for computing the similarity value. If the data has cycles, the data set dimensions may contain the cycle without splitting it. If the data set has dimensions, the data set may not be able to contain the pattern, and the similarity value might yield high variance. A high variance may allow for less reuse of the corresponding model. One approach for identifying the best data dimensions is to use trends and seasonality algorithms. Seasonal Autoregressive Integrated Moving Average (SARIMA or Seasonal ARIMA) may be implemented to identify the trends (e.g., length and pattern) of the time series data set. This can be used for fixing the dimensions of data and used for computing the similarly value.

Dissimilarity circuit 134 is also configured to measure the sensitivity of the model to data received previously (e.g., by data processing circuit 130). The sensitivity measurement may be used to determine the acceptable similarity that can be used for performing artificial intelligence (AI) operations. For example, the sensitivity can be exploited by the system to flag similar data sets and model data store 140. The system may choose not to train/re-train the model based on the flag rather than a similarity value. The model sensitivity can also be exploited by AI pipeline to optimize re-training.

Dissimilarity circuit 134 is configured to identify data sets and perform a similarity computation on the data set. The similarity computation may be performed on data sets comprising, for example, many dimensions or one dimension across many timelines.

Accuracy circuit 136 is configured to determine an accuracy value of a model. The accuracy value may compare the actual results of the model with the expectation of the results of the model. In other examples, the accuracy value may correspond with an F1-score to identify whether data has influence on the model outcome. The F1-score may measure a model's accuracy on the dataset when evaluating binary classification systems (e.g., 1/0, or "positive"/"negative"). When using the F1-score as the accuracy value, the determination may determine the harmonic mean of the model's precision and recall. Illustrative examples of comparing the actual and predicted results are provided with FIG. 6.

Accuracy circuit 136 is also configured to determine a sensitivity of the model. For example, the sensitivity may measure the proportion of actual positive output that got predicted as positive (e.g., true positive) as compared with the predicted positive output that get predicted incorrectly as negative (e.g., false negative). Sensitivity may be calculated as (True Positive)/(True Positive+False Negative).

Accuracy circuit 136 is also configured to determine mean squared error (MSE) of the model. MSE may correspond with the average of the squared error that is used as the loss function for least squares regression. The MSE may correspond with the sum, over all the data points, of the square of the difference between the predicted and actual target variables, divided by the number of data points.

Output circuit 138 is configured to examine the output and metrics (e.g., accuracy, FI score, etc.) to identify whether data has influence on the model outcome. Illustrative examples of the output, including a visual comparison of the actual and predicted results, are provided with FIG. 6.

Output circuit 138 is configured to determine output based on the type of model and purpose of generating the data set. For example, when the model is a forecasting model, the output may provide forecasting values corresponding with a likelihood of generating future data.

Output circuit 138 is configured to determine a similarity threshold for the AI application. In some examples, the similarity threshold may correspond with a predetermined value for a particular client, data set, data type, and the like. The similarity threshold may be stored with artificial intelligence computing device 120.

Figure 2:
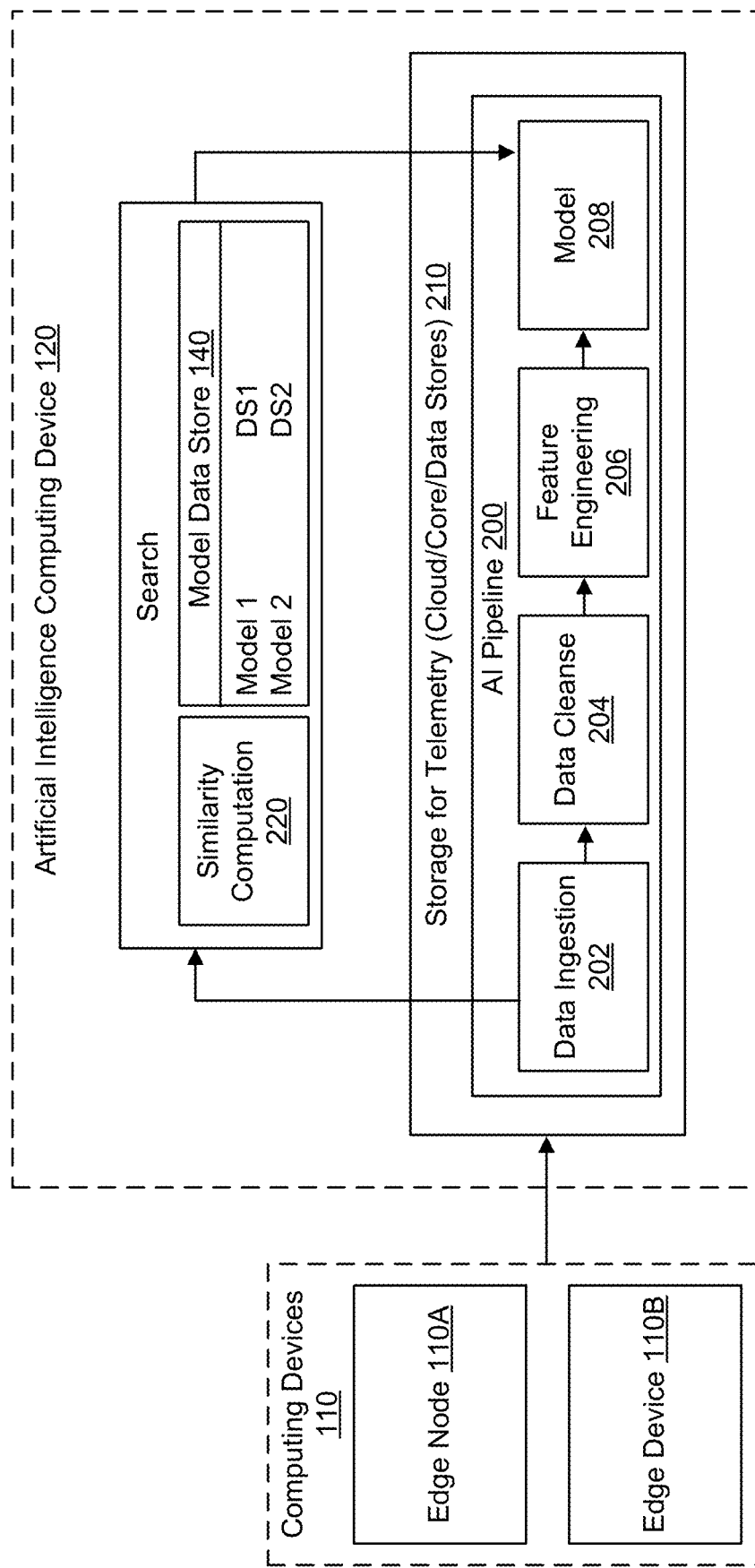
FIG. 2 illustrates a process for optimizing generation and reusability of machine learning models, in accordance with some embodiments of the application.

FIG. 2 illustrates an artificial intelligence modeling pipeline. For example, computing devices 110 may generate time series data and transmit the data to artificial intelligence computing device 120, as illustrated in FIG. 1.

As first data comes from computing devices 110 to artificial intelligence computing device 120, AI pipeline 200 is initiated and builds a model for the data set. A model can learn from the data and predict with high accuracy as much as it is trained with new data sets. However, training may be a compute and time intensive operation. A model can take anywhere from an hour to several days/weeks before it becomes ready for inference.

For example, computing devices 110 (e.g., an infrastructure element like a SimpliVity® node) send the data (e.g., telemetry) to artificial intelligence computing device 120 where storage 210 (typically in the order of petabytes) stores the data. The system may act on this data set along AI pipeline 200 that consumes this data. For incoming data, artificial intelligence computing device 120 can initiate a similarity computation 220 to compute the similarity value between the data and data that has been previously received and stored with the system. Based on the similarity value, artificial intelligence computing device 120 can determine an existing model that closely resembles the data set that the model was trained on. If there is no such model, a new model may be created for that data set and update the catalog with that information.

AI pipeline 200 may implement various processes on the incoming data to generate the model. For example, the processes may include data ingestion 202, data cleanse 204, feature engineering 206, and modeling 208.

Data ingestion 202 may receive the data from computing devices 110 (e.g., via application programming interface (API), scheduled data transmission, etc.). The data may include Telemetry or other time series data from infrastructure elements (e.g., Viz®), storage, network, and/or servers.

When new data are received, a similarity computation 220 may be initiated. As new data sets arrives, the system can initiate similarity computation 220 to determine a second similarity value for the data and existing models to identify similar data sets in model data store 140. If a similar model exists, then the model corresponding to that data set is used with high confidence. This is one way the system can reduce the retraining of the existing models and optimize the AI pipeline resource consumption.

Model data store 140 can build a repository of models along with data. For new instances of data when models are generated, a copy of the model is stored in model data store 140. For high volume models, the actual model can be stored in the storage repository and a reference to it can be stored in model data store 140.

As illustrated, model data store 140 may comprise model 1 corresponding with data set 1 (DS1) and model 2 corresponding with data set 2 (DS2). If DS2 were the new data set received by AI pipeline 200, this data set would be compared with DS1, which previously exists in model data store 140 to determine the similarity value between these two data sets.

Returning to AI pipeline 200, a data cleanse 204 may be initiated for both reusing an existing model and creating a new model. Data cleanse 204 may reformat the data, including translating the data from an unstructured to a structured format, removing blank spaces or characters, removing noise (e.g., null values, duplicates), processing node data to generate a standard format, and the like. Several analytical applications may be developed specifically for ingesting time series data, including forecasting, recommendation, anomaly detection, etc.

Feature engineering 206 may also be implemented. In feature engineering 206, AI pipeline 200 may determine which portions of the data best determine the output of the model. In some examples, the feature engineering process may use using domain knowledge to extract features from raw data via data mining techniques. These features can be used to improve the performance of model by selecting the key attributes of the model that determine the output.

When a model is used (e.g., either previously generated, previously trained, or newly generated and trained, etc.), artificial intelligence computing device 120 can determine an accuracy value as well. The accuracy value may measure how closely the predicted model output matches the actual model output, as further described with FIG. 6.

Figure 3:
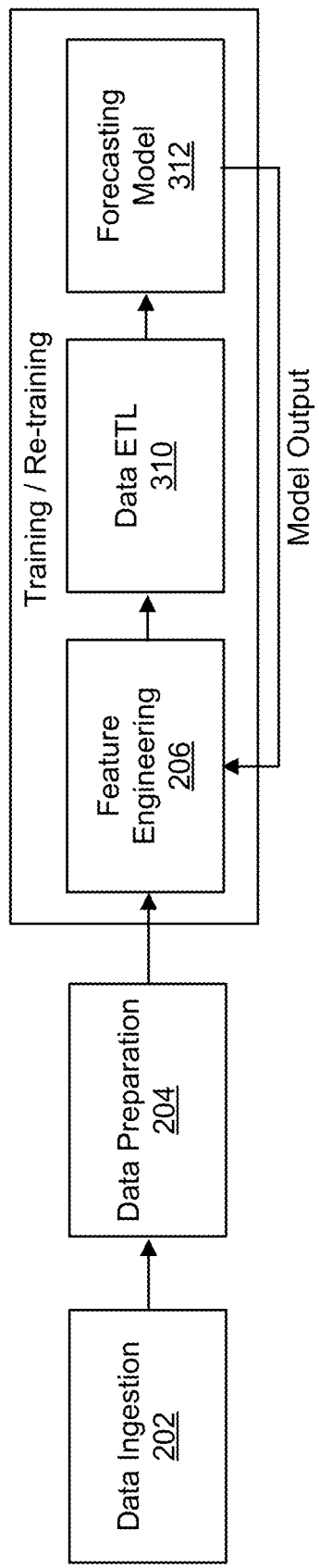
FIG. 3 illustrates a process for optimizing generation and reusability of machine learning models, in accordance with some embodiments of the application.

FIG. 3 illustrates a process for optimizing generation and reusability of machine learning models, in accordance with some embodiments of the application. For example, the process may illustrate from the time the data is ingested as raw dataset to when the forecasting model is finally produced. In this process, data ingestion 202, data cleanse 204, and feature engineering 206 may be repeated for a new data set, as illustrated with FIG. 2.

The data set may be examined through statistical methods to identify the correct set of features for feature engineering 206. The correct set of features may correspond with one or more features used to develop the model. As an illustrative example, sensor data may comprise temperature, pressure, heat of the node, and the like. The correct set of features for feature engineering 206 may select one or more of these variables of sensor data as features (e.g., to assign more weight/bias, etc.). In some instances, the variable with the most change or variability may be selected with the correct set of features. The model may undergo several optimizations which can require several training iterations with a different set of features. New optimizations may be used for training.

Along with the training, the feature set may be modified to obtain better results. Once the model metrics are obtained (e.g., predicted values of the applications that correspond with the output), a final model can be produced. The stages involved in feature selection and obtaining the final working model may correspond with model fitting or training, as illustrated in FIG. 3.

Data extract, load, and transform (ETL) 310 may be executed. In some examples, data ETL 310 may also be implemented with AI pipeline 200, as illustrated with FIG. 2. Data ETL 310 may comprise one or more operations on the data, including summation, averaging, and the like. New data may be generated and stored with the Data ETL 310 process in model data store 140.

Forecasting model 312 may be executed. The forecasting may predict a future output based on current and historical data. In some examples, one or more statistical algorithms may receive the historical data to make predictions on what is likely to happen in the future. The output from the forecasting model may be used as input to feature engineering 206.

Figure 4:
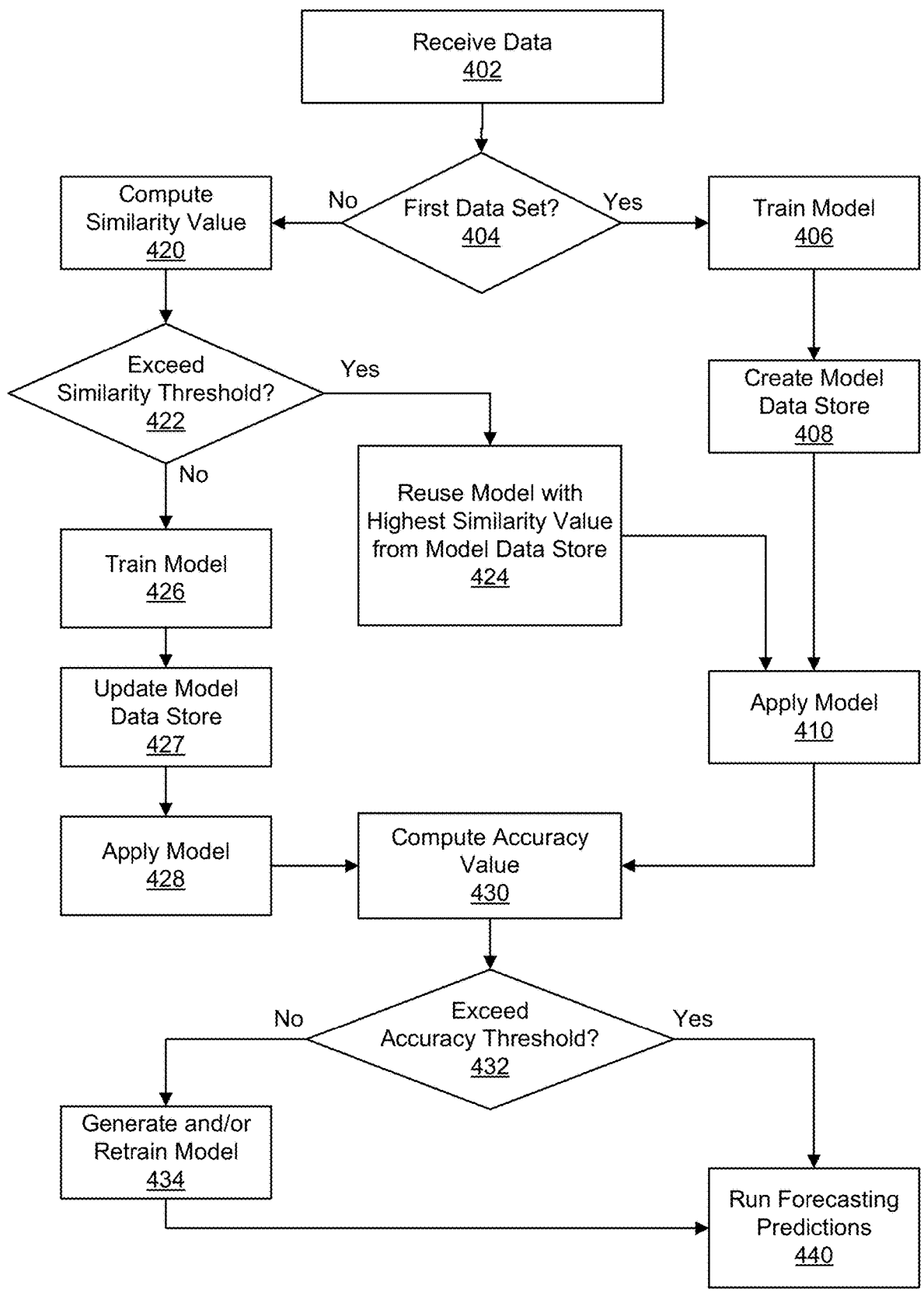
FIG. 4 illustrates a process for optimizing generation and reusability of machine learning models, in accordance with some embodiments of the application.

FIG. 4 illustrates a process for optimizing generation and reusability of machine learning models, in accordance with some embodiments of the application. This process may include the steps of reusing models in model catalog. On data ingestion, based on the availability of the Model catalog either a new model is created or model is reused.

At block 402, the process may receive data. This process may correspond with data ingestion 202, data cleanse 204, and/or feature engineering 206 as illustrated in FIG. 2. The process may proceed to block 404.

At block 404, the process may determine whether the data are the first set. If yes, the process may proceed to block 406. If no, the process may proceed to block 420.

At block 406, the process may train a model using the received data. The process may proceed to block 408.

At block 408, the process may create a model data store and store the newly trained model in the model data store. The process may proceed to block 410.

At block 410, the process may apply the model to the received data set. In some examples, the application of the model to the received data set may correlate at least two data sets to a single ML model. The process may proceed to block 430.

At block 420, the process may compute a similarity value when the received data is not the first data set. The process may proceed to block 422.

At block 422, the process may determine whether the similarity value exceeds a similarity threshold. If yes, the process may proceed to block 424. If no, the process may proceed to block 426.

At block 424, the process may reuse a model with the highest similarity value from the model data store. For example, the process may search for a first data set that is similar to the received data set. The first data set may be associated with a previous ML model. The process may proceed to block 410.

At block 426, the process may train a model using the received data. The process may proceed to block 427.

At block 427, the process may update a pre-existing model data store and store the newly trained model in the model data store. The process may proceed to block 428.

At block 428, the process may apply the model to the received data set. For example, if the similarity value is within threshold, then reuse and/or apply the previous ML model (originally corresponding with the first data set) on the second dataset. The process may proceed to block 430.

At block 430, the process may compute an accuracy value. The process may proceed to block 430.

At block 432, the process may determine whether the accuracy value exceeds an accuracy threshold. If yes, the process may proceed to block 440. If no, the process may proceed to block 434.

At block 434, the process may generate or retrain an existing model from the model data store. For example, if the accuracy value is not above the accuracy threshold, or if the similarity value is not within the similarity threshold, the process may train or retrain another model on the second dataset and apply that second model. In some examples, when the accuracy value does not exceed the accuracy threshold, the similarity threshold is adjusted for the first model. The process may proceed to block 440.

At block 440, the process may run forecasting predictions (e.g., on either the first model or the second model using the second data set, etc.).

FIG. 5 illustrates sample metrics for determining similarity between machine learning models, in accordance with some embodiments of the application. For example, this data show a sample model catalog constructed from a capacity counter of computing device 110. The data may arrive in a fixed interval, for example once in 5 mins or 10 mins or once in a day. When the first data set (DS1) arrives, the data may be represented as a block of data in either single or multi-dimensional metrics. The model catalog may be empty with DS1. Therefore it proceeds to create a new model and an entry in the model catalog.

When a second data set (DS2) arrives, similarity evaluation is done with the existing entries in the model catalog. If there is a similar data set in the model catalog, the model corresponding to that data set is returned and predictions are done using that model. However, if there is no corresponding similar data set, a new model is created and stored in the catalog. In this example it can be seen DS1 and DS2 does not show similarity therefore new models are created.

For the third data set (DS3), a similarity match of 1 (100% similar) is observed 510. The system may proceed to use that instance of the model associated with DS2. Data sets 6-12 also show similarity to DS2. The model corresponding with DS2 is reused for all those data sets.

The table also measures the errors observed from the actual to the predictions made by these models. Additionally for purpose of illustration, the process may also train on each incoming data set and measure its error with the actual. Sensitivity of the model for time series forecasting refers to the difference in the error observed between the forecast values and the actual observed and the acceptable value is set by the application that uses the model.

This error measure can be used to control the acceptable levels of similarity at the edges based on the similarity value and similarity threshold. For instance, two data sets similar to each other has sensitivity measure S1 and S2 respectively. If the difference (S1−S2) is small (that can be set as acceptable threshold) it indicates that the model is not sensitive to the lost data. This directly translates to acceptable similarity.

The similarity threshold may indicate the similarity level between two instances of data. As an illustrative example, threshold of 80% indicates that data sets showing similarity as high as 80% or greater. The similarity threshold may be adjusted based on data set, data source, data type, and the like. The more the error, the more is the model sensitive to the similarity. Therefore the similarity threshold may be reduced to increase more data to flow from edges to core. If the error levels are low, it indicates that models are not sensitive to the similar data and therefore the edges can optimize transmission of such data sets. This values of threshold as estimated by the sensitivity observed through error can be used to control the rates of transmission in the edges.

The function that captures similarity of the data with respect to model may include:

$$(\text{Similarity of } D(m)) \Big|_{\forall m \in MV_j} \min MDiff(D(m))$$

where $MV_j$ is the $j^{th}$ entry in the model catalog, m is the total number of models in the model catalog, MDiff(D(m)) indicates the difference in the Mean squared error of the data set with the predicted values when a model fitted on the data set is used versus when a model is reused from the catalog. Other equations may be used without diverting from the essence of the disclosure. In some examples, the similarity is limited by the minimum error observed that does not affect the model output in terms of the predictions using a model in the catalog. In some examples, if the difference in the error observed in the model output by using a model from the catalog and a model that is trained on that data set is small, then there is benefit using model from the catalog.

Figure 6:
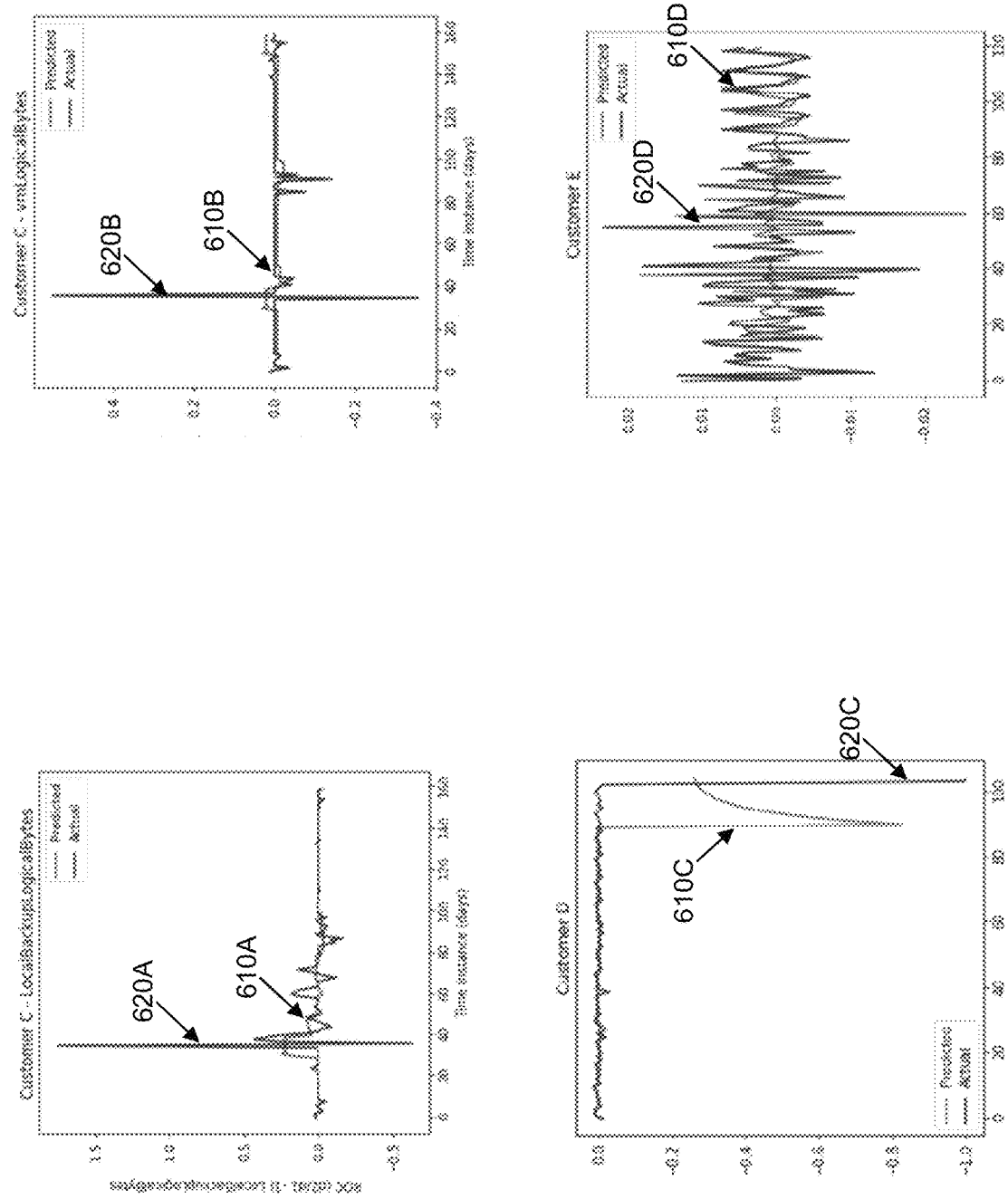
FIG. 6 illustrates actual values and predicted values to compare reused models where similarity is observed, in accordance with some embodiments of the application.

FIG. 6 illustrates actual values and predicted values to compare reused models where similarity is observed, in accordance with some embodiments of the application. In the illustration, predicted output 610 and actual output 620 are provided, illustrated as first predicted output 610A and first actual output 620A, second predicted output 610B and second actual output 620B, third predicted output 610C and third actual output 620C, and fourth predicted output 610D and fourth actual output 620D.

These model comparisons may be generated after the similarity value for each model is compared with the summary threshold, and at the point of determining the accuracy value in comparison with the accuracy threshold. Each of these models may be initially chosen based on a similarity value exceeding the similarity threshold for the pre-existing model. This part of the process may compare the accuracy of pre-existing model with the data set in comparison with the accuracy of a new model with the data set (e.g., new model generated specifically for the new data set). The illustrations may show each predicted output using the new data set with each of these models.

For example, first predicted output 610A includes some spikes that appear to correlate with first actual output 620A, however not to the intensity observed in first actual output 620A. This may be based on the data set used to train the original model may not match exactly with the new data set that is compared to it. There may be new patterns and values in the new data that were not determined in the original data set used to train the model that determines first predicted output 610A. A new model may be generated when the difference between first predicted output 610A and first actual output 620A at one or more time series data exceeds the accuracy threshold.

When no match is determined, the system may retrain an existing model to more closely correspond with the new data set, or may generate a new model using the new data set.

Figure 7:
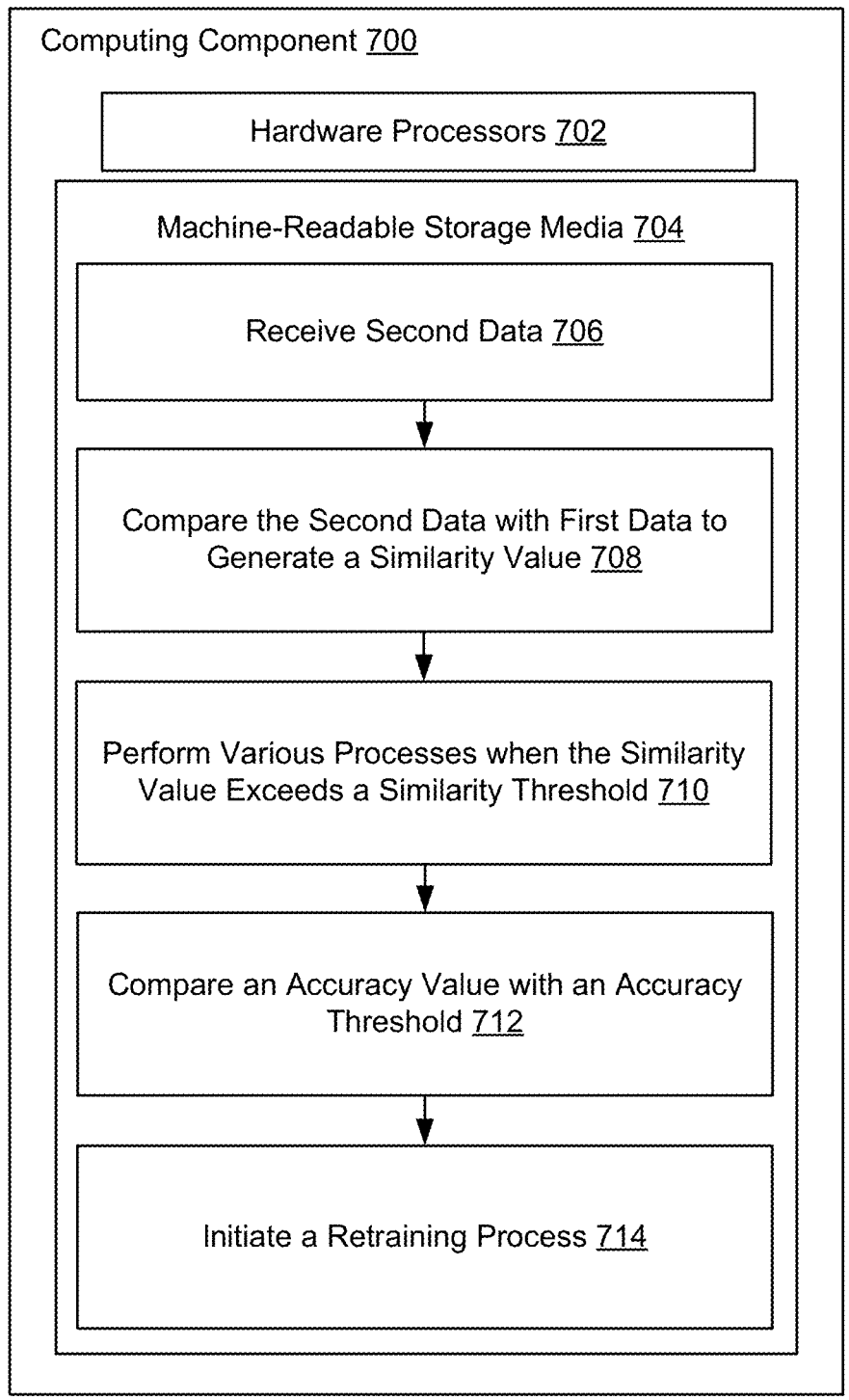
FIG. 7 is an illustrative computing component for determining reusability of machine learning models, in accordance with some embodiments of the application.

FIG. 7 is an illustrative computing component for determining reusability of machine learning models, in accordance with some embodiments of the application. Computing component 700 may be, for example, a server computer, a controller, or any other similar computing component capable of processing data. In the example implementation of FIG. 7, the computing component 700 includes a hardware processor 702, and machine-readable storage medium 704. In some embodiments, computing component 700 may be an embodiment of a system corresponding with artificial intelligence (AI) computing device 120 of FIG. 1.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-714, to control processes or operations for optimizing the system during run-time. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-714.

Hardware processor 702 may execute instruction 706 to receive data. For example, hardware processor 702 may receive from one or more computing devices, including an edge node or an edge device.

Hardware processor 702 may execute instruction 708 to compare the second data set with a first data set to generate a similarity value associated with the data characteristic, wherein the first data set was used to generate a first machine learning (ML) model. In some examples, hardware processor 702 may generate one or more assessment values in view of existing machine learning (ML) models. For example, hardware processor 702 may compare the data to existing data set information to generate a similarity value or other assessment value associated with the data characteristic.

Hardware processor 702 may execute instruction 710 to perform various processes with the similarity value exceeds a similarity threshold. For example, hardware processor 702 may reuse the first ML model to process the second data set, generate an output from the first ML model, and measure an accuracy value based on the output.

Hardware processor 702 may execute instruction 712 to compare the accuracy value to an accuracy threshold.

Hardware processor 702 may execute instruction 714 to initiate a retraining process to generate a second ML model associated with the second data. For example, when the accuracy value does not exceed the accuracy threshold or when the similarity value does not exceed the similarity threshold, hardware processor 702 may initiate the retraining process.

In some examples, the process may retrieve a model or generate a new model based on the assessment value (e.g., similarity value, accuracy value, etc.) compared with a threshold (e.g., similarity threshold, accuracy threshold, etc.). For example, when the similarity value exceeds a similarity threshold, hardware processor 702 may reuse the first ML model to process the second data set. In another example, when the similarity value does not exceed the similarity threshold, hardware processor 702 may apply a second ML model to the second data set to generate an accuracy value. In another example, when the accuracy value exceeds an accuracy threshold, hardware processor 702 may initiate a retraining process with the second ML model associated with the second data. In another example, when the accuracy value does not exceed the accuracy threshold, hardware processor 702 may generate a new ML model associated with the second data. In some examples, when the accuracy value does not exceed the accuracy threshold, the similarity threshold is adjusted for the first model.

In some examples, the first data set and the second data set are time series data sets.

In some examples, the similarity threshold and the accuracy threshold are different values.

In some examples, the first data set and the second data set originate from different sources.

In some examples, the accuracy value exceeds the accuracy threshold based on a drift-based determination.

In some examples, hardware processor 702 may execute an instruction to store the new ML model with the first ML model and the second ML model in a model data store.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 8:
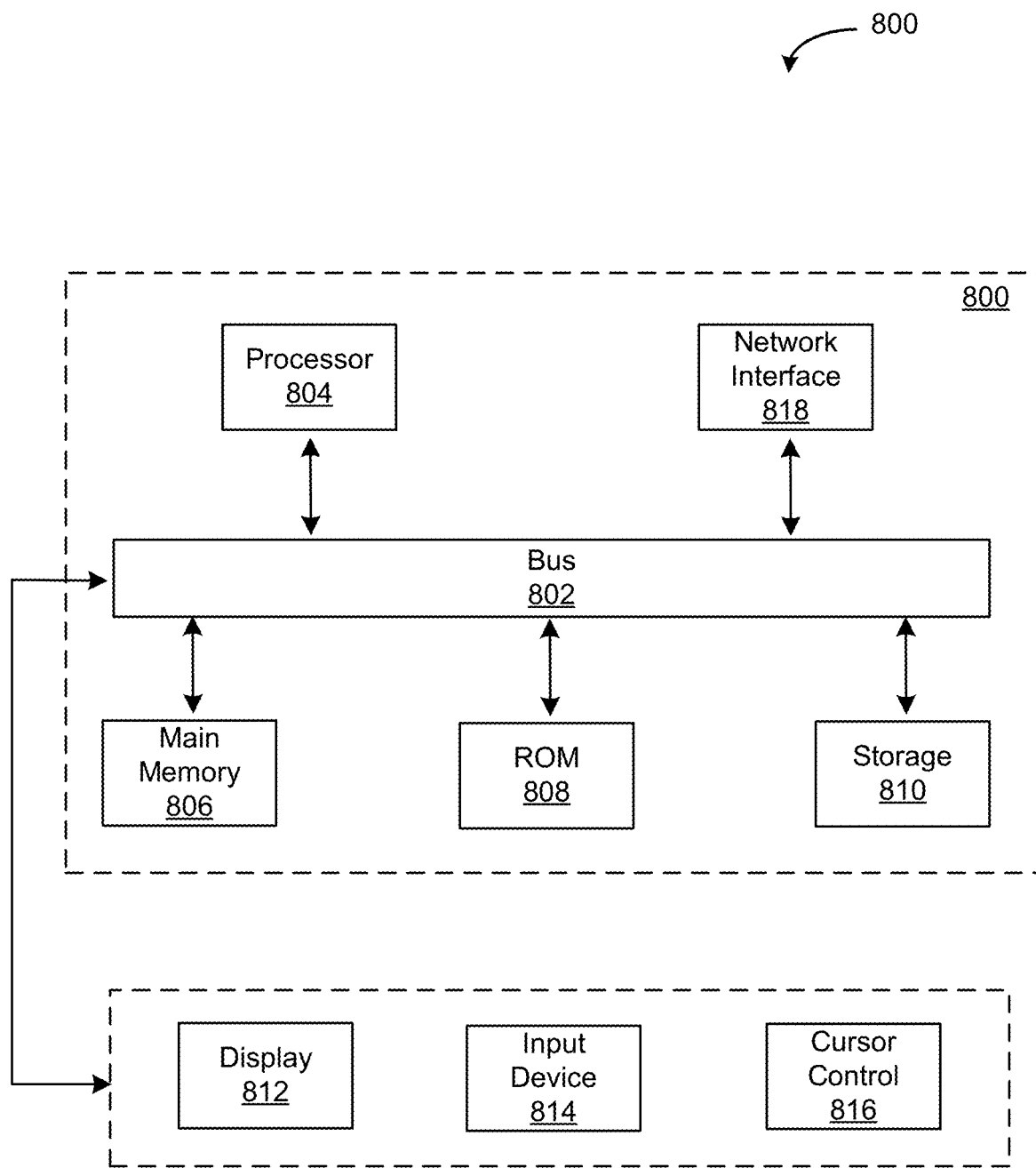
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing platform comprising:
   a set of edge devices comprising a first edge device and a second edge device that generate time series data sets in near real time,
   wherein the first edge device is configured to:
     process a first processing workload in a first environment where the first edge device is located, and
     generate a first time series data set associated with the first processing workload;
   wherein the second edge device is configured to:
     process a second processing workload in a second environment where the second edge device is located, and
     generate a second time series data set associated with the second processing workload; and
   a central computing system comprising:
     a memory; and
     one or more processors configured to access the memory and execute machine readable instructions stored to:

receive a first machine learning (ML) model, the first ML model being trained using the first time series data set;

receive the second time series data set, the second time series data set being generated by the second edge device;

determine that the second time series data set comprises a data characteristic;

compare the second time series data set with the first time series data set to generate a similarity value associated with the data characteristic;

when the similarity value exceeds a similarity threshold:
reuse the first ML model to process the second time series data set,
generate an output from the first ML model, and
measure an accuracy value based on the output;
compare the accuracy value to an accuracy threshold; and
when the accuracy value does not exceed the accuracy threshold or when the similarity value does not exceed the similarity threshold, initiate a retraining process to generate a second ML model associated with the second time series data set.

2. The computing platform of claim 1, wherein the instructions further to:
when the accuracy value exceeds the accuracy threshold, run forecasting predictions with the first or second ML model.

3. The computing platform of claim 1, wherein when the accuracy value does not exceed the accuracy threshold, the similarity threshold is adjusted for the first ML model.

4. The computing platform of claim 1, wherein the similarity threshold and the accuracy threshold are different values.

5. The computing platform of claim 1, wherein the accuracy value exceeds the accuracy threshold based on a drift-based determination.

6. The computing platform of claim 1, wherein the instructions further to:
store the second ML model with the first ML model in a model data store.

7. The computing platform of claim 1, wherein a determination to reuse the first ML model to process the second time series data set is executed in near real time.

8. The computing platform of claim 1, wherein the first time series data set and the second time series data set are transmitted from the first edge device and the second edge device, respectively, as data matrices where rows represent time instances and columns represent a dimension being ingested.

9. A computer-implemented method comprising:
processing, by a first edge device of a computing platform, a first processing workload in a first environment where the first edge device is located;
generating, by the first edge device, a first time series data set associated with the first processing workload;
processing, by a second edge device of the computing platform, a second processing workload in a second environment where the second edge device is located;
generating, by the second edge device, a second time series data set associated with the second processing workload;
receiving, by a central computing system of a computing platform, a first machine learning (ML) model, the first ML model being trained using the first time series data set;

receiving, by the central computing system, the second time series data set, the second time series data set being generated by the second edge device;
determining, by the central computing system, that the second time series data set comprises a data characteristic;
comparing the second time series data set with the first time series data set to generate an assessment value associated with the data characteristic;
when the assessment value exceeds a similarity threshold:
reusing the first ML model to process the second time series data set,
generating an output from the first ML model, and
measuring an accuracy value based on the output;
comparing the accuracy value to an accuracy threshold; and
when the accuracy value does not exceed the accuracy threshold or when the assessment value does not exceed the similarity threshold, initiating a retraining process to generate a second ML model associated with the second time series data set.

10. The computer-implemented method of claim 9, further comprising:
when the accuracy value exceeds the accuracy threshold, run forecasting predictions with the first or second ML model.

11. The computer-implemented method of claim 9, wherein the first data set and the second data set are time series data sets.

12. The computer-implemented method of claim 9, wherein the similarity threshold and the accuracy threshold are different values.

13. The computer-implemented method of claim 9, wherein the first data set and the second data set originate from different sources.

14. The computer-implemented method of claim 9, wherein the accuracy value exceeds the accuracy threshold based on a drift-based determination.

15. The computer-implemented method of claim 9, further comprising:
storing the second ML model with the first ML model in a model data store.

16. A non-transitory computer-readable storage medium storing a plurality of instructions executable by one or more processors, the plurality of instructions when executed by the one or more processors cause the one or more processors to:
receive a second data set comprising a data characteristic, the second data set being generated by a second edge device or node that collects the second data set from a second processing workload from a second environment where the second edge device is located;
compare the second data set with a first data set to generate a similarity value associated with the data characteristic, the first data set being generated by a first edge device or node that collects the first data set from a first processing workload from a first environment where the first edge device is located, wherein the first data set was used to generate a first machine learning (ML) model;
when the similarity value exceeds a similarity threshold:
reuse the first ML model to process the second data set,
generate an output from the first ML model, and
measure an accuracy value based on the output;
compare the accuracy value to an accuracy threshold; and
when the accuracy value does not exceed the accuracy threshold or when the similarity value does not exceed the similarity threshold, initiate a retraining process to generate a second ML model associated with the second data.

17. The computer-readable storage medium of claim 16, wherein the plurality of instructions further cause the one or more processors to:
when the accuracy value exceeds the accuracy threshold, run forecasting predictions with the first or second ML model.

18. The computer-readable storage medium of claim 16, wherein the similarity threshold and the accuracy threshold are different values.

19. The computer-readable storage medium of claim 16, wherein the first data set and the second data set originate from different sources.

20. The computer-readable storage medium of claim 16, wherein the accuracy value exceeds the accuracy threshold based on a drift-based determination.

* * * * *